United States Patent [19]

Autrata et al.

[11] Patent Number: 5,679,107
[45] Date of Patent: Oct. 21, 1997

[54] DEFLECTION-CONTROLLABLE ROLL FOR A CALENDER OR SIMILAR DEVICE

[75] Inventors: Jochen Autrata, Moers; Wolf Gunter Stotz, Ravensburg, both of Germany

[73] Assignee: Voith Sulzer Finishing GmbH, Krefeld, Germany

[21] Appl. No.: 513,211

[22] Filed: Aug. 10, 1995

[30] Foreign Application Priority Data

Aug. 26, 1994 [DE] Germany .................. 44 30 268.1

[51] Int. Cl.$^6$ ............................................. B29C 43/46
[52] U.S. Cl. ................................................ 492/7
[58] Field of Search ......................... 492/7, 2, 16, 20; 100/162 B; 384/99, 100

[56] References Cited

U.S. PATENT DOCUMENTS

| | | | |
|---|---|---|---|
| 3,802,044 | 4/1974 | Spillmann et al. | |
| 3,846,883 | 11/1974 | Biondetti | 492/7 |
| 4,556,454 | 12/1985 | Dahl et al. | 492/7 |
| 4,776,069 | 10/1988 | Snellman | 492/7 |
| 4,996,862 | 3/1991 | Schroers. | |
| 5,290,223 | 3/1994 | Lehmann | 492/7 |

FOREIGN PATENT DOCUMENTS

| | | |
|---|---|---|
| 38 27 836 C1 | 10/1989 | Germany . |
| 2 169 010 A | 7/1986 | United Kingdom . |

*Primary Examiner*—David P. Bryant
*Attorney, Agent, or Firm*—Darby & Darby

[57] ABSTRACT

A deflection-controllable roll for a calender has an inner support element and an outer support element. Each of the two support elements has a pressure portion and a piston. The pressure portions have support areas with inner and outer pockets. The pistons have pressure areas which delimit an inner pressure chamber and an outer pressure chamber, both of which are connected on one side with the associated pocket by a feed line equipped with a throttle, and on the other side, by a feed line in the carrier. In this way, the deflection-controllable roll is capable of operating in a wide range of line loads, using the available pressures.

13 Claims, 2 Drawing Sheets

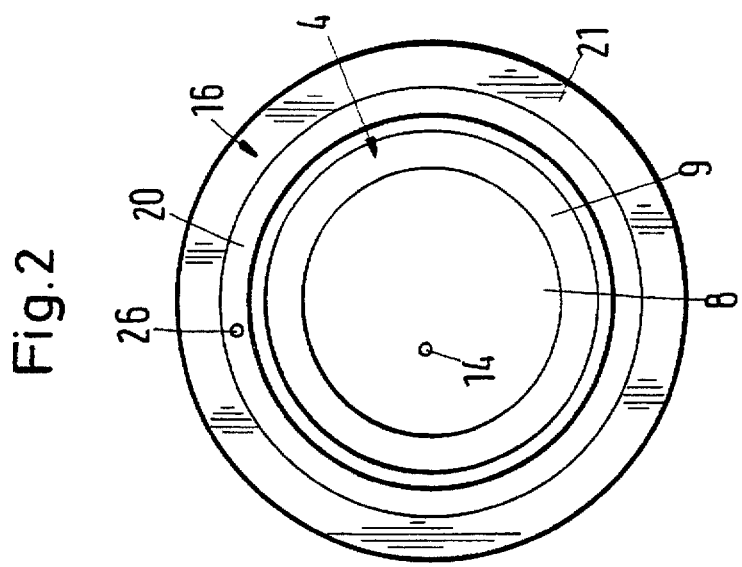
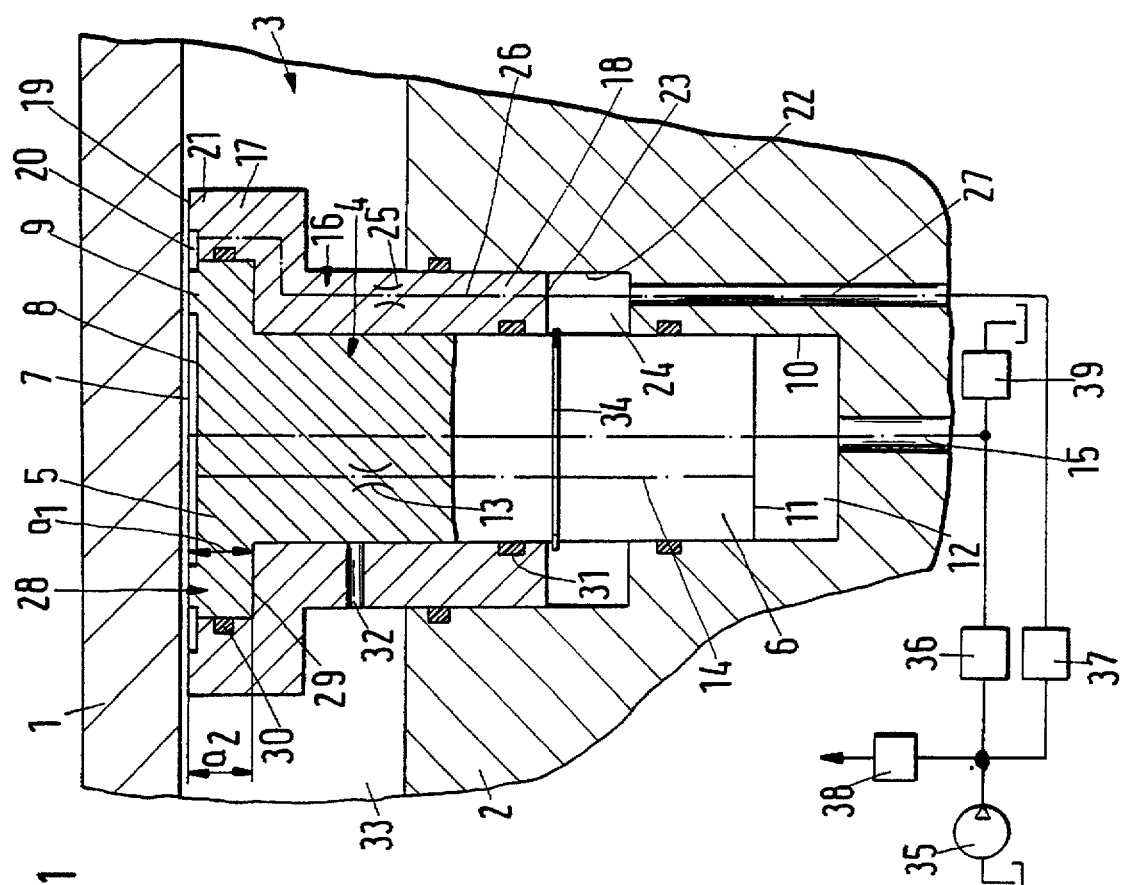

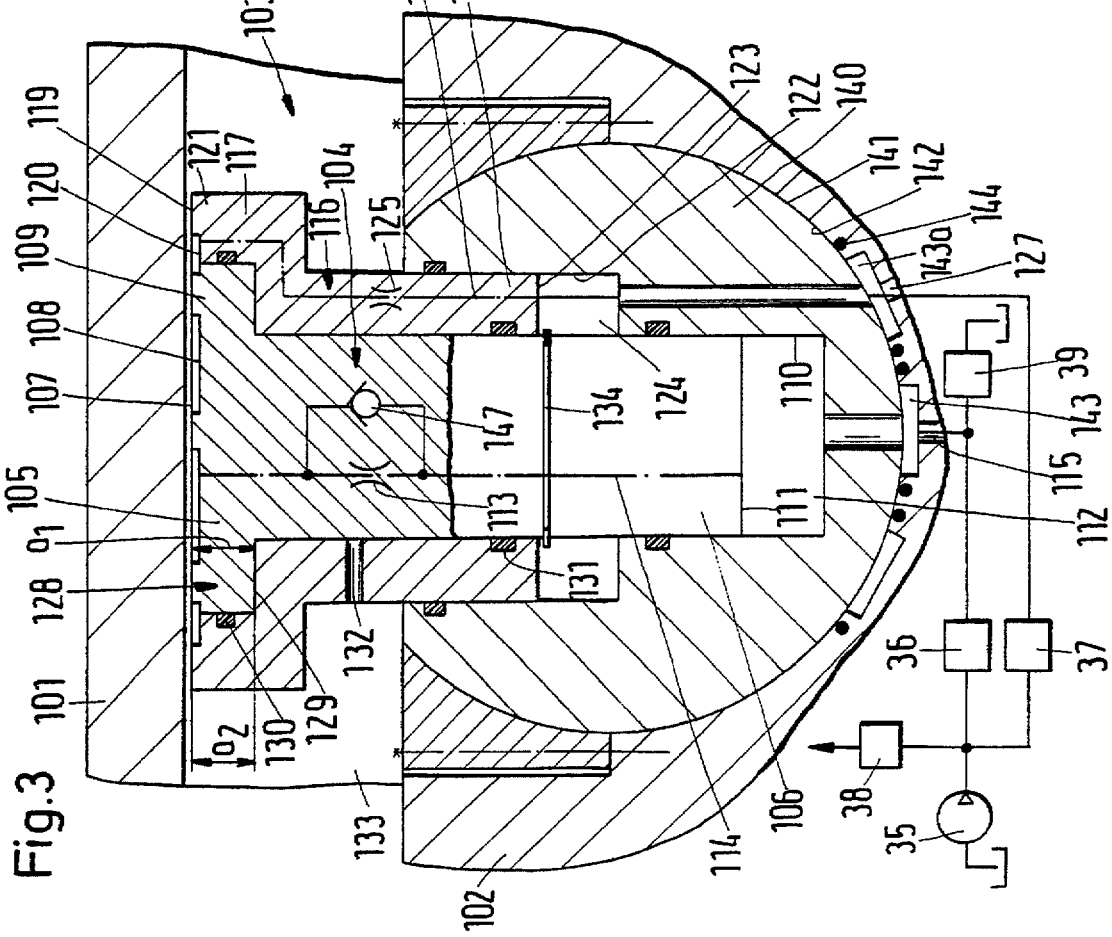

DEFLECTION-CONTROLLABLE ROLL FOR A CALENDER OR SIMILAR DEVICE

FIELD OF THE INVENTION

This invention relates generally to a deflection-controllable roll for a calender or similar device, and more particularly to a roll, in which, with the aid of hydrostatic support elements, a roll sleeve is supported on a fixed carrier that penetrates the roll sleeve. The support elements have a pressure portion which bears against the roll sleeve, forming a support area facing the inside surface of the roll sleeve. The pressure portions have at least one pocket, fully encircled by an edge, and a piston which delimits, by means of a pressure area facing the carrier, a pressure chamber which is connected on the one side with a feed line in the carrier, and on the other, with the pocket by means of a throttle.

BACKGROUND OF THE INVENTION

A deflection controllable roll of this type is known, for example, from U.S. Pat. No. 3,802,044, which discloses a roll suitable not only for calenders, but also for glazing rollers; presses; batches of paper, cellulose and printing presses; or rolling mills for steel, plastic and the like.

In conventional rolls, the piston of the support dement engages a radial bore in the carrier which produces a circular support area. The range of force that can be applied in this way is limited by the available hydraulic pressures. The hydraulic pressures are limited in the downward direction by the pressure control valves and in the upward direction by the materials that are used. As a result, it is not possible to selectively operate the same deflection-controllable roll with a wide range of line loads in the roll gap.

SUMMARY OF THE INVENTION

Accordingly, it is an object of the present invention to provide an improved deflection-controllable roll.

It is a further object of the present invention to provide a deflection-controllable roll capable of operating in a wide range of adjustable line loads.

According to the invention, at least one of the support elements is enclosed as an inner support element by a ring-shaped outer support element, and the outer support element has an outer pressure portion which bears against the roll sleeve, forming a support area facing the inside surface of the sleeve. The outer support element also has an additional ring-shaped outer pocket that is fully edged, and an outer piston which delimits, by means of a ring-shaped outer pressure area facing the carrier, an outer pressure chamber, which is connected on one side with a second line in the carrier, and on the other, with the outer pocket by means of a second throttle.

An inner and an outer support element are allocated to a support region, without a significant increase in the space requirement. These support elements can be actuated either individually or in common. As a result, it is possible to apply varying forces so that a greater range of adjustable line loads is provided.

The inner and outer pistons are positioned adjacent to each other along a single cylindrical area. Since the pistons are positioned adjacent to each other, the size of the support elements can be reduced, resulting in a significant space savings.

The inner piston is cylindrical, engages with a cylindrical bore and forms with the bore, the inner pressure area. It is also preferable that the outer piston is formed as a hollow cylinder, engages with an extension of the cylindrical bore having a larger diameter than the main portion of the cylindrical bore, and forms with the cylindrical bore, as well as with the inner piston, the outer pressure chamber. This results in a simplified design with parts that can be manufactured easily.

It is also advantageous to fasten a driver to the inner piston that engages under the outer piston and is capable of actuating the outer support element in the direction of the piston's stroke. The driver also prevents unwanted displacement of the outer support element in the event of actuation of the inner support element only.

In a preferred embodiment, the inner pressure portion has a larger outside diameter than the inner piston, and the outer pressure portion has a larger outside diameter than the outer piston. The outer pressure portion has a step-like recess, the outer diameter of which corresponds to that of the inner pressure portion, for receiving the inner pressure portion. The increased size of the pressure portions makes it possible to provide larger pocket areas, which provides larger support areas.

The cylindrical gap between the inner and the outer piston, as well as between the inner and the outer pressure portions, are each sealed by means of a ring seal and are connected with an intermediate chamber, between the roll sleeve and the carrier, by means of a channel provided between the ring seals. As a result of this connecting channel, the stepped area of the recess is under a neutral ambient pressure. It is preferable that the height of the inner pressure portion, between its underside and the outer area of the edge of the inner pocket, is smaller than the height of the recess, between its base and the outer area of the edge of the outer pocket. In this way, a gap is provided at the step of the recess which allows a radial inward movement of the inner support element, so that upon actuation of only the outer support element, frictional losses can occur solely in the region of the outer pocket's edge.

The inner support element and the outer support element are held in a pendulum-like manner with respect to the carrier. This allows a matching of the support areas to the inside surface of the sleeve, even if the carrier and/or sleeve deform.

The inner piston and the outer piston are guided in a bearing element which has a spherical surface and which is supported in a spherical mounting of the carrier.

A central groove is provided between the bearing element and mounting, along with a ring groove that surrounds the central groove in a concentric manner, by means of which the pressure medium is directed to the inner and outer pressure chambers. The grooves allow the pressure medium to be supplied even during the pendulum motion. In addition, when the grooves are appropriately dimensioned in comparison with the pressure areas, they hydraulically relieve the bearing element.

Furthermore, the inner pocket and/or outer pocket are sub-divided, by means of separating webs, into a number of partial pockets which are offset in the radial direction. Each of the partial pockets is connected with the inner and outer pressure chambers by a throttle. As a result, the stabilization of the support elements is increased by means of the partial pockets being individually supplied with pressure medium.

Preferably, at least the inner piston's throttle is bridged by a check valve that opens towards the pressure chamber. In this way, if only the outer pocket is supplied with the pressure medium, the check valve ensures that there is no buildup of pressure in the inner pocket.

BRIEF DESCRIPTION OF THE DRAWINGS

FIG. 1 is a longitudinal cross-section through a region of support of the preferred support element combination according to the present invention.

FIG. 2 is a top view of the inner and the outer support elements of FIG. 1.

FIG. 3 is a longitudinal cross-section through a region of support of an alternate support element combination according to the present invention.

FIG. 4 is a top view of the inner and the outer support elements of FIG. 3.

DETAILED DESCRIPTION OF THE INVENTION

Referring to FIGS. 1 and 2, a roll sleeve 1 is penetrated by a fixed carrier 2, which supports the roll sleeve 1 by means of a support element combination 3. As disclosed in U.S. Pat. No. 3,802,044, several regions of support can be placed adjacent to each other, axially. Therefore, since a series of the support element combinations 3 can be configured in the same manner as shown in FIG. 1, only a limited region of support is shown. In particular, the roll sleeve 1 can work together with a second roll to create a roll gap in which paper or other material can be processed by means of compression forces.

The support element combination 3 includes an inner support element 4, which has a pressure portion 5 and a portion which is a cylindrical piston 6. The pressure portion 5 bears against the roll sleeve 1, forming a support area 7, in which there is located a pocket 8 that is fully encircled by an edge 9. The piston 6 engages a cylindrical bore 10, and has a pressure area 11 which, along with the bore 10, delimits a pressure chamber 12. The pressure chamber 12 is connected on the one side with the pocket 8, by means of a feed line 14 which is equipped with a throttle 13, and on the other side, in the carrier 2 by means of a feed line 15 to a pressurized oil supply.

An outer support element 16 has a pressure potion 17 and a portion which is a hollow cylindrical piston 18. The pressure portion 17 bears against the roll sleeve 1, forming a ring-shaped support area 19 with a ring-shaped pocket 20, which is fully encircled by an edge 21. The piston 18 engages an enlarged cylindrical bore extension 22 which is formed within the bore 10, and is guided on the inside, along the piston 6. The piston 18 has a ring-shaped pressure area 23 which, along with the bore extension 22 and the piston 6, forms a ring-shaped pressure chamber 24. The pressure chamber 24 is connected on the one side with the pocket 20 by means of a feed line 26 which is equipped with a throttle 25, and on the other side, in the carrier 2 by means of a feed line 27 to a pressurized oil supply.

The inner pressure portion 5 has a larger outside diameter than the associated piston 6. The outer pressure portion 17 has a larger outside diameter than the associated piston 18. In this way, the pressure-active support areas 7 and 19 can be larger than the associated pressure areas 11 and 23, which provides a larger support area on the roll sleeve 1. Furthermore, a recess 28 with a step 29 is provided in the outer pressure portion 17, which serves to accept the inner pressure portion 5. By means of ring seals 30 and 31 between the peripheral area of the inner pressure portion 5 and the inner area of the recess 28 and the peripheral area of the inner pressure portion 5 and the inner area of the pressure portion 17, the pressure that results in the pocket 20 is prevented from acting upon the underside of the pressure portion 5. In this regard, it is advantageous to provide a channel 32 between the ring seal 30 and the ring seal 31 and between the two pistons 6 and 18, which leads to an intermediate chamber 33 between the roll sleeve 1 and the carrier 2. The pressure that results then also acts upon the lower ring area of the pressure portion 5.

The height of the inner pressure portion 5 between its underside and the outer area of the edge 9 is shown by $a_1$. The height of the recess 28 between the base of the step 29 and the outer area of the edge 21 of the outer pocket 20 is shown by $a_2$. When there is actuation of the outer support element 16, the inner support element 4 is actuated as a result. In addition, an annular spring 34 is provided on the piston 6 as a driver, and engages under the piston 18 and as a result, actuates the outer support element 16 when the inner support element 4 is actuated. As a rule, the heights $a_1$ and $a_2$ are of equal size. In some cases, however, it is advantageous for $a_1$ to be somewhat smaller than $a_2$, which will be explained further.

A pressurized oil supply is represented schematically in FIG. 1. A pressure source 35, preferably in the form of a pump, operates three closable pressure regulators 36, 37 and 38.

If the pressure regulator 36 is activated, pressurized fluid, such as oil, will enter into the pressure chamber 12 though the feed line 15, thereby actuating the inner support element 4. The oil then flows through the feed line 14 and the throttle 13, into the pocket 8, and possibly through the edges 9 and 21 into the intermediate chamber 33.

If the pressure regulator 37 is activated, pressurized fluid will enter into the pressure chamber 24 through the feed line 27, thereby actuating the outer support element 16. The fluid then flows through the feed line 26 and the throttle 25, into the outer pocket 20, from which the fluid can flow through the edge 21 into the intermediate chamber 33, and possibly through the edge 9 into the pocket 8.

The pressure regulator 38 is used to keep the pressure in the intermediate chamber 33 at a selected value.

Finally, the feed line 15 may be connected with a discharge line with the aid of a simple check valve 39, so that the inner support element 4 acts as a pressure sink. For this purpose, the throttle 13 should be bridged by a check valve.

To operate the inner support element 4 only, the feed line 27 is closed off by the pressure regulator 37 and only the pressure chamber 12 is supplied with pressure medium through the feed line 15. The inner support element 4 then acts as a conventional support element with a force which is determined by the pressure in the pocket 8 and the effective support area 7 of the inner support element 4. As this occurs, the outer support element 16 can be lifted by means of the driver 34. In this way, a low line load level can be achieved with the desired pressure-force ratio.

To operate the outer support element 16 only, the feed line 15 is closed off by the pressure regulator 36 and only the pressure chamber 24 is supplied with pressure medium. The pressure that results in the associated pocket 20 also acts in the pocket 8 of the inner support element 4. Since both of the support areas 7 and 19 are activated, the roll sleeve 1 can process a high line load, even though only moderate pressures are being used. If the height $a_1$ is smaller than the height $a_2$, frictional losses occur only at the gap between the outer edge 21 and the roll sleeve 1.

To operate both support elements 4 and 16, different pressures are fed to the pressure chambers 12 and 24. For example, the pressure in the intermediate chamber 33 is set to a value greater than zero. In the outer pocket 20, a pressure is set that is greater than the pressure in the intermediate chamber 33. In the inner pocket 8, a pressure is set that is greater or less than the pressure in the intermediate chamber 33. In this way, the level for the line load is maintained with the outer support element 16, while variations in load can be fine-tuned with the inner support element 4. If the height $a_1$ is equal to the height $a_2$, the outer support element 16 ensures that the correct gap between the edge 9 and the roll sleeve 1 is maintained at the inner support element 4.

Referring to FIGS. 3 and 4, reference numbers for corresponding parts are used that have been increased by 100 from those used in FIGS. 1 and 2.

Preferably, the inner support element 104 and the outer support element 116 are guided inside a bearing element 140, having a spherical surface 141 and supported in a two-part spherical mount 142 of the carrier 102. As a result, the support elements 104 and 116 can move in a pendulum-like manner relative to the carrier 102, due to the action of the bearing element, so that the feeding of the pressurized medium is maintained, thus providing a constant support pressure. However, matching connecting grooves, namely a central groove 143 and a ring groove 143a that surrounds the central groove 143 concentrically, are provided, each of which is surrounded by a seal 144. The connecting grooves 143 and 143a can be provided in the bearing element 140 instead of in the carrier 102. By means of appropriately dimensioned connecting grooves 143 and 143a, the bearing element 140 is hydraulically relieved with respect to the carrier 102, which eases the pendulum-like motion of the entire support arrangement.

At the inner support element 104, the inner pocket 108 is divided by means of separating webs 145 into four partial pockets b, e, d, and e, which are offset in the radial direction, each of which is connected to the inner pressure chamber 112 by means of a feed line 114 and associated throttle 113. Similarly, the ring-shaped pocket 120 is divided by means of separating webs 146 into partial pockets f, g, h, and i, which are offset in the radial direction, each of which is connected to the ring-shaped pressure chamber 124 by means of a feed line 126 and associated throttle 125. In this case, the ring-shaped pocket 120 is delimited on the inside by the circumferential wall of the pressure portion 105.

The pendulum-like support of the support elements 104 and 116 allows a matching of the support area to the inside of the sleeve 101, as a result of which a uniform lubrication gap is provided over the entire support area. Through the use of the partial pockets b through i, this matching occurs automatically, which results in an increased stability of the bearing element 140.

The throttle 113 in the feed line 114 is bridged by a check valve 147 that opens to the inner pressure chamber 112. As a result, pressure cannot build up in the pocket 108 of the inner support element 104 if the pressure medium is fed only to the ring-shaped pocket 120.

While the embodiments of the invention shown and described are fully capable of achieving the results desired, it is to be understood that this embodiment has been shown and described for purposes of illustration only and not for purposes of limitation. Other variations in the form and details that occur to those skilled in the art and which are within the spirit and scope of the invention are not specifically addressed.

For example, any number of partial pockets can be provided. Also, the piston 6 of the inner support element 4 can be shortened and the inner support element 4 guided entirely inside the outer support element 16, in conjunction with which the ring-shaped piston 18 of the outer support element 16 is guided within a corresponding ring-shaped groove in the carrier 2 or in the bearing element 140. Therefor, the invention is limited only by the appended claims.

What is claimed is:

1. A deflection-controllable roll for a calender, comprising:

a fixed carrier;

a roll sleeve supported on said carrier wherein said carrier penetrates said roll sleeve; and a hydrostatic support element having a pressure portion which bears against said roll sleeve, forming a support area facing the inside surface of said roll sleeve, said support element comprising:

an inner support element having an inner pressure portion at an upper end of said inner support element and an inner piston at a lower end of said inner support element, said inner support element having an inner support area on said inner pressure portion, said inner support area bearing against said inside surface of said roll sleeve, and said inner support area having an inner pocket fully encircled by an edge, said inner pocket opening towards said inside surface of said roll sleeve, said inner piston of said inner support element extending into and slidably engaging a bore in said carrier, said inner piston of said inner support element and said bore forming an inner pressure chamber, said inner pressure chamber connected to a first pressure supply line in said carrier, said inner pressure chamber connected to an inner feed line in said inner support element, said inner feed line passing through said inner support element and connecting to said inner pocket, and said inner feed line having a first throttle;

an outer support element enclosing said inner support element, said outer support element having an outer pressure portion at an upper end of said outer support element and an outer piston at a lower end of said outer support element, said outer pressure portion of said outer support element adjacent to and enclosing said inner pressure portion of said inner support element, said outer pressure portion having an outer support area bearing against said inside surface of said roll sleeve, said outer support area having an outer pocket fully encircled by an outer edge, said outer pocket opening towards said inside surface of said roll sleeve, said outer piston of said outer support element extending into and slidably engaging an enlarged extension of said bore in said carrier, said outer piston of said outer support element, said enlarged extension of said bore and said inner piston of said inner support element forming an outer pressure chamber, said outer pressure chamber connected to a second pressure supply line in said carrier, said outer pressure chamber connected to an outer feed line in said outer support element, said outer feed line passing through said outer support element and connecting to said outer pocket, and said outer feed line having a second throttle.

2. The roll of claim 1, wherein said inner and outer pistons are guided adjacent to each other along a single cylindrical area.

3. The roll of claim 1, wherein said inner piston is cylindrical, engages with a cylindrical bore and forms with said cylindrical bore, said inner pressure area, and said outer piston is of a hollow cylindrical shape, engages an enlarged cylindrical bore extension of said cylindrical bore, and forms, with said outer piston as well as with said inner piston, said outer pressure chamber.

4. The roll of claim 1, further comprising a driver attached to said inner piston that engages an underside of said outer piston and is capable of actuating said outer support element in the direction of the inner piston's stroke.

5. The roll of claim 1, wherein said inner pressure portion has a larger outside diameter than said inner piston, and said outer pressure portion has a larger outside diameter than said outer piston, said outer piston also has, for receiving said inner pressure portion, a step-like recess having a base, an inside diameter of said outer pressure portion corresponding to an outside diameter of said inner pressure portion.

6. The roll of claim 5, wherein a cylindrical gap, formed between said inner and said outer pistons as well as between said inner and said outer pressure portions, is sealed by means of first and second ring seals and connects with an intermediate chamber, formed between said roll sleeve and said carrier, by means of a channel provided between said ring seals.

7. The roll of claim 6, wherein the height of said inner pressure portion between an underside of said inner pressure portion and an outer area of said edge of said inner pocket is smaller than the height of said recess between said base of said step-like recess and said outer area of said edge of said outer pocket.

8. The roll of claim 1, wherein said inner support element and said outer support element are held in a pivotable manner with respect to said carrier.

9. The roll of claim 8, wherein said inner piston and said outer piston are guided in a bearing element which has a spherical surface and which is supported in a spherical mounting of said carrier.

10. The roll of claim 9, wherein a central groove is provided between said bearing element and said mounting, along with a ring groove that surrounds said central groove in a concentric manner, by means of which a pressure medium is directed to said inner pressure chamber and to said outer pressure chamber.

11. The roll of claim 1 wherein said inner pocket is sub-divided by means of separating webs into two or more partial pockets which are offset in the radial direction and each of which is connected with said inner pressure chamber by means of a throttle.

12. The roll of claim 11, wherein said throttle in said inner piston is bridged by a check valve that opens towards said pressure chamber.

13. The roll of claim 1 wherein said outer pocket is sub-divided by means of separating webs into two or more partial pockets which are offset in the radial direction and each of which is connected with said outer pressure chamber by means of a throttle.

* * * * *